(12) United States Patent
Alby et al.

(10) Patent No.: US 9,944,378 B2
(45) Date of Patent: Apr. 17, 2018

(54) STRUCTURAL ELEMENT FOR AN AIRCRAFT FUSELAGE THAT PREVENTS LATERAL-TORSIONAL BUCKLING

(71) Applicants: Airbus Operations (SAS), Toulouse (FR); Airbus Operations GmbH, Hamburg (DE)

(72) Inventors: Sebastien Alby, Tournefeuille (FR); Laurent Giuseppin, Finhan (FR); Markus Mueller, Friedrichshafen (DE)

(73) Assignee: AIRBUS OPERATIONS SAS, Toulouse (FR)

( * ) Notice: Subject to any disclaimer, the term of this patent is extended or adjusted under 35 U.S.C. 154(b) by 626 days.

(21) Appl. No.: 14/502,670

(22) Filed: Sep. 30, 2014

(65) Prior Publication Data

US 2015/0083861 A1    Mar. 26, 2015

Related U.S. Application Data

(63) Continuation of application No. PCT/EP2012/052969, filed on Dec. 18, 2012.

(30) Foreign Application Priority Data

Dec. 21, 2011    (FR) .................................. 11 62136

(51) Int. Cl.
*B64C 1/06*    (2006.01)
*B64C 3/18*    (2006.01)
(Continued)

(52) U.S. Cl.
CPC ................ *B64C 1/061* (2013.01); *B64C 1/06* (2013.01); *B64C 1/064* (2013.01); *B64C 1/12* (2013.01);
(Continued)

(58) Field of Classification Search
CPC .......... B64C 1/06; B64C 1/061; B64C 1/064; B64C 1/065; B64C 1/12; B64C 3/18;
(Continued)

(56) References Cited

U.S. PATENT DOCUMENTS

| 7,716,835 B2 | 5/2010 | Johnson et al. |
|---|---|---|
| 2010/0272954 A1 | 10/2010 | Roming et al. |
| 2011/0011980 A1 | 1/2011 | Tacke et al. |

FOREIGN PATENT DOCUMENTS

WO    2009037006    3/2009

OTHER PUBLICATIONS

International Search Report, Feb. 18, 2013.

*Primary Examiner* — Nicholas McFall
(74) *Attorney, Agent, or Firm* — Greer, Burns & Crain, Ltd.

(57) ABSTRACT

The invention relates to a structural element for an aircraft fuselage, generally shaped in the form of a longitudinally elongate section. The element comprises two wings, each wing including: a portion that extends uninterrupted along the entire length of the section, and legs spaced apart from one another and extending from said uninterrupted portion such as to define an opening between two consecutive legs. One of the legs of one wing is arranged to face at least part of the opening defined between two consecutive legs of the other wing. Consequently, the structural element can be produced from a single fibrous preform on a curved tool, minimizing waste material and reducing the weight of said element.

16 Claims, 4 Drawing Sheets

(51) Int. Cl.
    *B64C 1/12*    (2006.01)
    *B64C 1/18*    (2006.01)
    *B64C 1/00*    (2006.01)
(52) U.S. Cl.
    CPC .................. *B64C 1/18* (2013.01); *B64C 3/18* (2013.01); *B64C 3/182* (2013.01); *B64C 3/187* (2013.01); *B64C 2001/0081* (2013.01)
(58) Field of Classification Search
    CPC ......... B64C 3/182; B64C 3/185; B64C 3/187; E04C 5/065; E04B 9/065; E04B 9/122; E04B 9/125
    See application file for complete search history.

STRUCTURAL ELEMENT FOR AN AIRCRAFT FUSELAGE THAT PREVENTS LATERAL-TORSIONAL BUCKLING

CROSS-REFERENCES TO RELATED APPLICATIONS

This application is a continuation of International Application PCT/FR2012/052969 filed Dec. 18, 2012, designating the United States and published on Jun. 27, 2013 as WO 2013/093323. This application also claims the benefit of the French patent application No. 1162136 filed on Dec. 21, 2011. The entire disclosures of the above are incorporated herein by way of reference.

BACKGROUND OF THE INVENTION

The invention relates to a mechanical structure, more particularly a structure for an aircraft fuselage.

In general, aircraft fuselage structures consist of a skin to which stiffeners or frames are attached, either directly (integrated frames) or by means of angle sections (or "clips"). These frames usually consist of I-section, z-section or c-section metal or composite hoops. These structures also comprise stringers arranged perpendicular to the frames.

Parts known as cleats are used to attach the frames to the stringers, in particular to prevent the frames from flexing by lateral-torsional buckling when they are loaded mechanically.

Document WO 2009/037006 discloses a structural component for the fuselage of an aeronautical machine, comprising a hollow profile and a support for this profile comprising a leg by means of which the component is attached to the skin.

The support presented in this document adopts the function of the angle sections and of the cleats and each of these is placed between each stringer over the entire length of the profile.

In this document, and in the other structures of the prior art, the great number of the pieces which are necessary for the mechanical integrity of the structure, and the complexity of their shape, lead to high costs. Furthermore, installation of the angle sections and the cleats on the panel between each stringer is a long and complex operation due to the adjustments which it requires, in particular given the tolerances which must be observed.

The invention proposes remedying at least one of the above drawbacks.

SUMMARY OF THE INVENTION

To that end, the invention relates to a structural element for an aircraft fuselage, the structural element being in the general shape of a profile which is elongate in a longitudinal direction wing comprising a part of the entire length of and comprising two wings, each which extends uninterrupted over the profile and legs which are spaced apart from one another and extend from this uninterrupted part so as to define an opening between two consecutive legs, one of the legs of a wing being arranged opposite at least part of the opening defined between two consecutive legs of the other wing.

Thus, the invention makes it possible to simplify the architecture of a structure of this type by reducing the number of parts employed. The associated manufacturing time and costs are thus reduced, as are the assembling time and costs. The reduction in the number of parts and assembling elements helps to reduce the overall mass, which is particularly desirable in the context of an aeronautical application.

By doing away with the angle sections and cleats, certain problems linked to adjusting the latter, more particularly linked to the assembly tolerance, are also resolved. In comparison with a structural element having solid wings, the presence of the openings also makes it possible to reduce the overall mass.

Finally, another advantage of the invention is to permit low-cost manufacturing of the frames of an aircraft fuselage, in particular when these are made of a composite or metallic material. Indeed, it is possible to manufacture multiple structural elements or frames from a flat blank. This makes it possible to simplify manufacturing, such that mass production is possible.

Furthermore, and in particular in the context of manufacturing using composites, it is possible to overlap the basic flat preforms in order to limit the discard rate.

Overlapping the preforms and reducing the mass of the structural element are particularly facilitated and effective when at least one opening of one of the two wings is intended to receive at least two through elements of elongate general shape in a direction transverse to the longitudinal direction of the profile. These through elements, which may be stringers, are for example perpendicular to the longitudinal direction of the profile.

In one particular embodiment, at least one of the two wings extends substantially perpendicular to the longitudinal direction of the profile.

In order to better stabilize the structural element and to facilitate the placement of elements such as floor crossmembers in an aircraft cabin, each wing comprises, at the free end of each leg, a foot which extends in a plane. This foot is intended to be attached to the skin of the fuselage.

More precisely, the profile is slightly curved such that its radius of curvature is locally perpendicular to the plane in which extends the foot of each leg.

Thus, the structural element matches the curvature of the fuselage skin to which it may be attached.

In one embodiment, the legs of at least one wing are substantially perpendicular to the feet.

Thus, once attached to the skin of the fuselage, one of the two wings is in a plane normal to the longitudinal axis of the fuselage.

Here too, this makes it possible to facilitate the placement of elements such as the floor crossmembers.

In another embodiment or in conjunction with the preceding embodiment, the legs of at least one wing form an obtuse angle with respect to the plane in which extends the foot of each leg. An obtuse angle of one or both legs with respect to the plane of the feet, or to the plane of the skin, improves the lateral-torsional buckling strength of the structural element.

In one embodiment, the structural element has a hat-shaped general profile or cross section.

According to one embodiment, at least one opening of one of the two wings is intended to receive a single through element of elongate general shape in a direction transverse to the longitudinal direction of the profile (a single stringer).

This embodiment is particularly suited to the regions of the structure which are to be reinforced. For example, the other wing comprises legs only where necessary to prevent lateral-torsional buckling.

In a more particular form, the openings of said at least one wing whose legs are substantially perpendicular to the feet of the wing are intended to each receive a single through element of elongate general shape in a direction transverse to the longitudinal direction of the profile.

Thus, the wing which is locally perpendicular to the plane of the fuselage, and which is more susceptible to lateral-torsional buckling, has less material removed than the first wing and is thus stronger.

Alternatively or in conjunction with this form, each of the legs is substantially perpendicular to the feet of each wing.

According to another embodiment, the openings of each wing are intended to each receive two through elements of elongate general shape in a direction transverse to the longitudinal direction of the profile.

In this case, the openings are offset from one wing to the other, in a "staggered" arrangement.

This embodiment is particularly suited to those regions not subjected to great load. Indeed, it makes it possible to limit the number of fasteners between the skin and the frame and, in so doing, to reduce costs and assembly time.

It also permits, by virtue of the large number of recessed regions (openings), a substantial saving in terms of mass.

Finally, the fact that the openings are in a staggered arrangement offers greater accessibility to the interior of the structural element or frame. This makes it possible to install standard fasteners on the wings of the frame (fittings with floor crossmembers, junctions of two frame sectors, bolted repair, etc.) while avoiding so-called "blind" fasteners.

According to one possible feature, the structural element is made of composite or metallic material.

As the structural element can be made as a single piece, and is of simple shape, it is particularly suited to a composite construction.

Thus, the structural element may be manufactured starting from a preform element may be manufactured made by braiding or by positioning multiaxial dry fibers and may be reinforced by unidirectional (UD) fibers placed along the longitudinal direction of the profile.

In the case that the structure to be reinforced is an aircraft fuselage, the structural element is, for example, made on the basis of carbon fibers, which are both lightweight and strong. However, other fibers having comparable properties may be envisaged.

Alternatively, the structural element is made of titanium or of aluminum, or any other metals which are both lightweight and strong.

According to one possible feature, the structural element for an aircraft fuselage is made starting from a single fibrous preform.

This is in particular the case when the structural element is made by infusing a dry fabric preform with resin. One advantage of this approach is to be able to manufacture several structural elements starting from one flat blank, by cutting out each structural element preform.

This manufacturing method is particularly efficient when the openings of each wing are intended to each receive two stringers (staggered openings).

Moreover, in comparison with continuous wings without openings, forming is simplified as the openings facilitate the forming, in particular when continuous fibers are used.

According to one possible feature of the invention, the height of each wing varies along the longitudinal direction of the profile.

More particularly, it is possible to make the cross section of the structural element change so as to adapt it to a particular region of the fuselage, to place elements (cables, wires, etc.) therein, to locally reduce its mass or, on the contrary, to locally increase its strength. For example, the wings may be locally lengthened.

According to one possible feature of the invention, the thickness of the element varies along the longitudinal direction of the profile.

More particularly, it is possible to adapt the thickness and the lay-up of various parts of the structural element (base, wings, legs) so as to locally increase its strength or, on the contrary, save on mass.

The invention also relates to a method for manufacturing a structural element for an aircraft fuselage, comprising a step of forming, on a tooling, an initially flat preform of a structural element as disclosed briefly above.

Using such a manufacturing method greatly facilitates the manufacture of the structural elements according to the invention in comparison with the uses of the c- or z-section frames of the prior art.

In particular, it makes it possible to envisage mass production of structural elements.

As each wing of the structural element comprises, at the end of each leg, a foot which extends in a plane, the tooling may have a curvature whose radius of curvature is perpendicular to the plane defined by the first and second longitudinal directions.

The use of such a method makes it possible to manufacture portions of structural elements (frames) for a fuselage or structural elements for a fuselage which are curved and no longer only straight portions of structural elements for a fuselage (not included). It is then possible to limit the number of junctions between portions of structural elements and to better distribute forces over the length of the structural element.

The invention also relates to an aircraft comprising a structural element as mentioned briefly above.

BRIEF DESCRIPTION OF THE DRAWINGS

Other features and advantages will appear in the following description, given by way of non-limiting example and with respect to the appended drawings, in which.

DETAILED DESCRIPTION OF THE PREFERRED EMBODIMENTS

Figure 1:
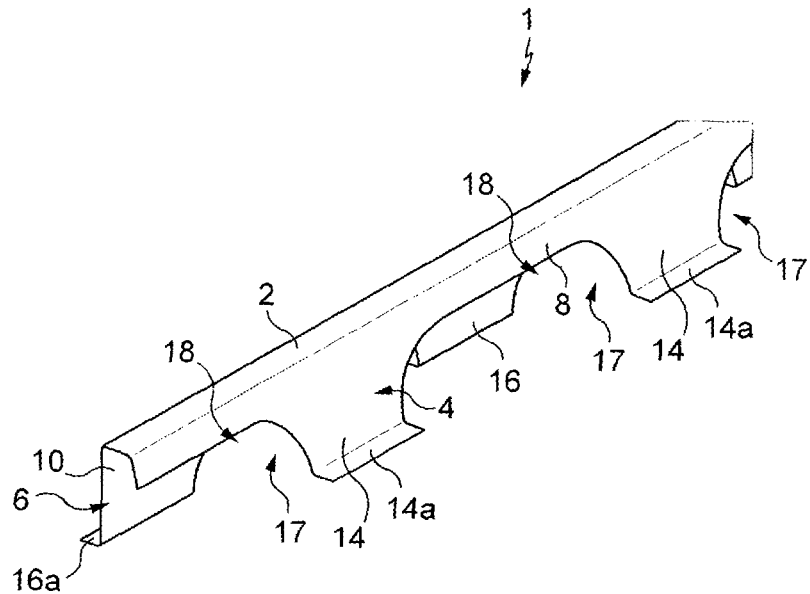
FIG. 1 is a schematic perspective representation of a structural element according to the invention, in a first embodiment.

The structural element 1 shown in FIG. 1, also called a frame, has the general shape of an elongate profile, extending locally in a longitudinal direction.

It will be noted that, in FIGS. 1 to 4, the structural elements shown appear to be straight, but in fact they are intended to be slightly curved so as to follow the curvature of the skin of the fuselage as will be seen below (see in particular FIGS. 5 and 6).

The structural element 1 comprises a base 2 (or cap) which is locally substantially flat, extending in this longitudinal direction, and is, for example, of rectangular cross section in FIG. 1 and those that follow.

It will however be noted that, for certain profile shapes, for example necessarily present, top of the profile.

It will also be noted that, the shape and thickness of the cross section of the profile may vary along the longitudinal direction.

The base 2 is mounted on a first wing 4 (on the right of the figure) and a second wing 6 (on the left of the figure).

The first and second wings 4, 6 each respectively comprise a first and a second body 8, 10 which are directly connected to the base 2 at the ends thereof which are opposite in the width direction (transverse direction perpendicular to the longitudinal direction) and which extend substantially perpendicular to the base and away therefrom.

The bodies 8, 10 also extend uninterrupted, in the longitudinal direction of the structural element 1, over the entire length of the base 2.

Each wing 4, 6 also respectively comprises multiple legs 14, 16 which extend in a regular manner respectively from each body 8, 10 in a direction substantially perpendicular to that of the longitudinal axis of the structural element 1.

More particularly, in the particular embodiment associated with this FIG. 1 (and FIGS. 2a and 2b), the second wing 6 and the base 2 are mutually perpendicular, while the angle (in absolute terms) formed between the first wing 4 and the base is slightly greater than 90°.

The first and second legs 14, 16 are in the shape of a bracket so as to be in planar contact with another element of the structure of the aircraft such as a skin 20. More precisely, they comprise, at their free end, feet 14a, 16a which extend in the plane of the skin 20 and which are attached to the skin.

The legs are respectively distributed along the bodies 8, 10 so as to respectively form between them first and second openings 17, 18.

In the embodiment associated with FIG. 1, each of the first openings 17 of the first wing 4 extends the length of the body 8 between two consecutive legs 14, so as to extend opposite one of the second legs 16.

More precisely, the first openings 17 are arranged longitudinally such that their middle is located opposite the middle of a second leg 16.

In the same way, each of the second openings 18 of the second wing 6 extends the length of the body 10 between two legs 16, so as to extend opposite a first leg 14.

More precisely, each second opening 18 is arranged longitudinally such that its middle is located opposite the middle of a first leg 14.

The openings 17, 18 are thus offset longitudinally from one wing to the other, in a "staggered" arrangement.

In this manner, part of each opening 17 is located opposite part of each opening 18, so as to allow, as will be seen below, stringers in an aircraft fuselage structure to pass through.

The constituent parts of the structural element 1 are preferably made from composite materials. For example, the base 2 is reinforced using unidirectional carbon fibers extending the length of its longitudinal direction.

Alternatively, the structural element 1 is made from metallic materials such as aluminum.

Whatever material is used, the constituent elements of the structural element 1 allow it to be made particularly strong in torsion and in bending. Indeed, the structural element 1 may bear against another part of the aircraft fuselage structure, such as a skin, via the legs 14, 16.

The structural element 1 is thus less susceptible to lateral-torsional buckling. It is thus possible to dispense with the cleats and angle sections of the prior art, whose purpose is advantageously fulfilled by the bracket shape of the legs 14, 16.

Figure 2A:
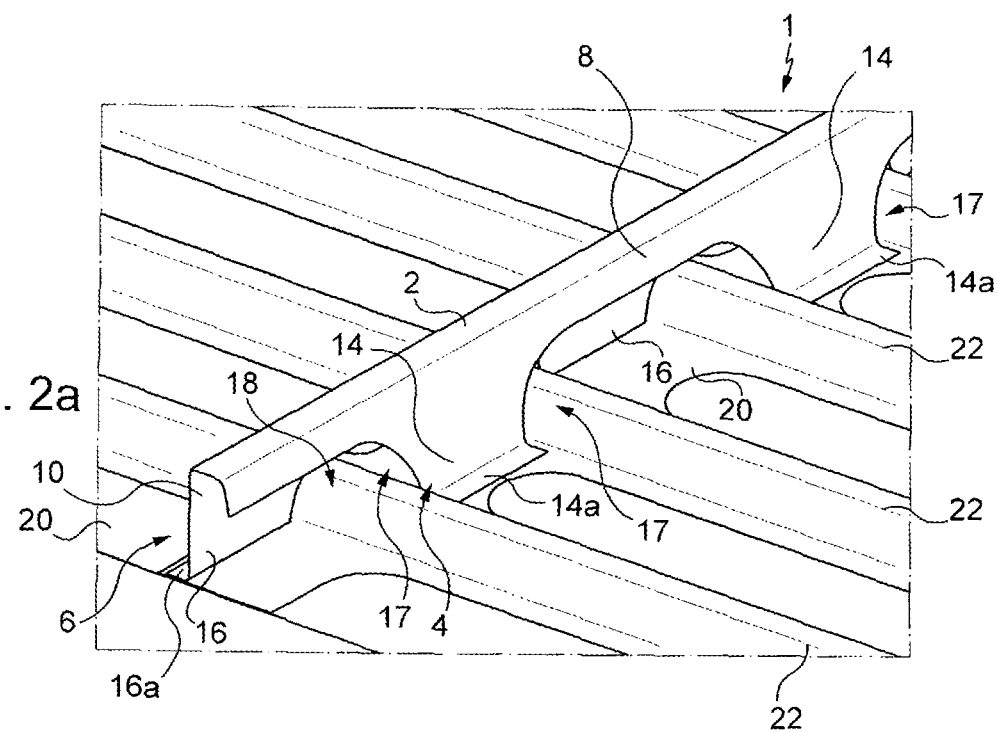
FIG. 2a is a schematic perspective representation of the structural element of FIG. 1, attached to a structural skin of an aircraft fuselage and through which pass stringers of this same structure.
Figure 2B:
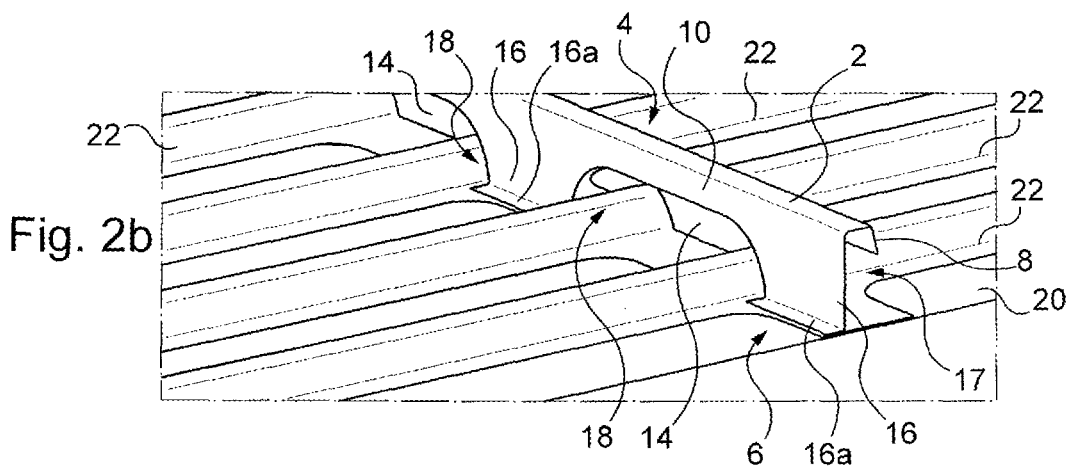
FIG. 2b is a schematic perspective representation of the structural element of FIG. 2a, from a different point of view.

There follows a description of the integration of the structural element 1 into a surrounding aircraft fuselage structure, with reference to FIGS. 2a and 2b. These figures show, from two different points of view, the position of the structural element 1 on a skin 20 to which stringers 22 are attached.

It will be noted that, in these figures and those that follow, the skin 20 is locally flat but that it is curved overall so as to create a fuselage.

Thus, the base 2 follows this curvature, its radius of curvature being locally perpendicular to the plane of the skin 20.

The stringers 22, here comprising profiles of hat-shaped cross section (other cross sections I-shaped, C-shaped or T-shaped are also conceivable), extend in a longitudinal direction which differs from the longitudinal direction of the structural element 1. This direction corresponds in general to that of the longitudinal axis of the fuselage. In the following, the first longitudinal direction will be defined as the direction of each stringer, and the second longitudinal direction will be defined as the longitudinal direction of the structural element.

In this case, the structural element 1 is placed such that the first substantially mutually structural element 1 is placed and second directions are perpendicular, although other angles may be suitable.

In this way, the first longitudinal direction, or direction of extent of the stringers, is normal to the plane containing the second wing 6.

Moreover, the structural element 1 is placed such that the openings 17, 18 allow the stringers 22 to pass through them.

Thus, each stringer 22 passes, along the second longitudinal direction, on one hand via an opening 17 and on the other hand via an opening 18.

Here, the length of each first and second opening 17, 18, considered in the second longitudinal direction, is advantageously selected such that two stringers 22 pass through (or are straddled).

Moreover, the shape of the openings is similar to a mouse hole so as to match the contour of the cross section of the stringers 22.

Each of the first and second legs 14, 16 is in planar contact with the skin 20 by virtue of the bracket shape. The feet 14a, 16a are, for example, attached by adhesive bonding, by screwed connection or by welding depending on the nature of the material from which the structural element is made.

The staggered structure of the structural element 1 makes it possible to reduce the number of its fasteners and, consequently, the time and cost necessary for assembly on the skin 20.

Furthermore, in comparison with a conventional hat-shaped structure without openings (solid wing structure), a substantial saving in terms of mass is obtained.

This embodiment is thus well suited to regions subjected to little load.

Finally, the particular orientation of the second wing 6 makes it possible to facilitate the placement of elements such as the floor crossmembers.

Figure 3A:
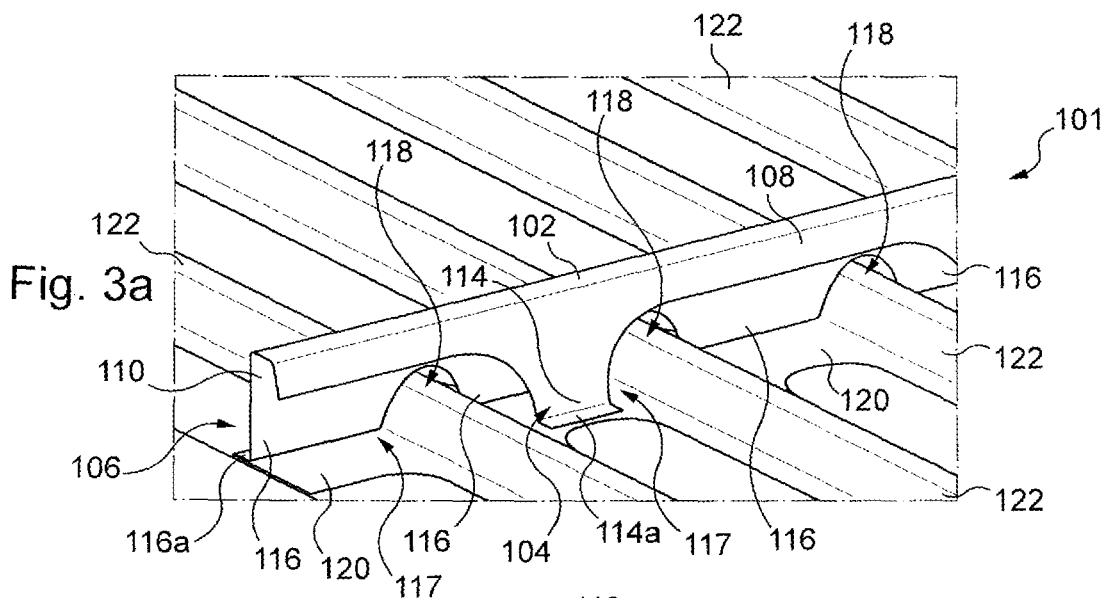
FIG. 3a is a schematic perspective representation of a structural element attached to a structural skin of an aircraft fuselage and through which pass stringers of this same structure in a second embodiment according to the invention.
Figure 3B:
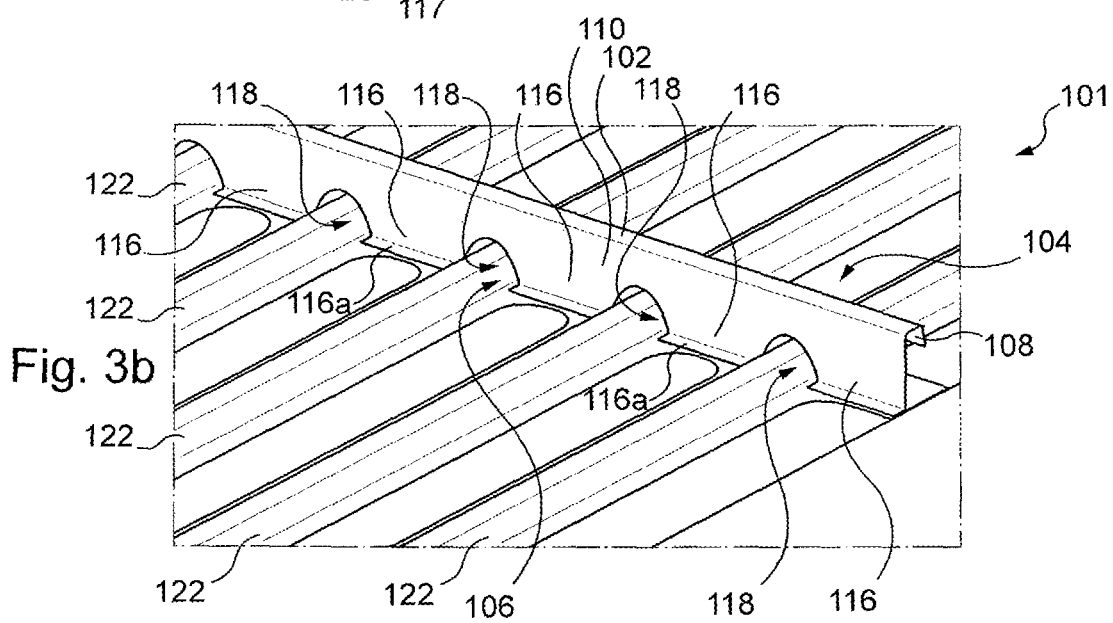
FIG. 3b is a schematic perspective representation of the structural element of FIG. 2a, from a different point of view.

FIGS. 3a and 3b show, from two different angles, a second embodiment according to the invention.

In this embodiment, a structural element 101 still comprises a base 102 which is depicted as flat but is intended to match, overall, the structure of the fuselage. At its ends, extending downward, are first and second wings 104, 106 respectively comprising bodies 108, 110 which extend without interruption along the longitudinal direction of the structural element 101.

The first wing 104 remains unchanged with respect to the first wing 14 of the first embodiment. It comprises the same number and the same arrangement of legs 114 and openings 117. The legs 114 still extend from the corresponding wing at an angle slightly greater than 90° and are attached to the skin 120 by planar contact of the feet 114a.

The second wing 106, for its part, extends as in the case of the first embodiment perpendicular to the base 102.

By contrast, as shown in FIG. 3b, it comprises a greater number of legs 116 and feet 116a, so as to form openings 118 through each of which one stringer 122 attached to the skin 120 can pass.

To that end, the openings 118 are cut out in the manner of mouse holes so as to match the contour of each stringer 122.

Thus, each opening 117 is opposite two openings 118.

This second embodiment makes it possible to increase the lateral-torsional buckling strength of the element 101. It is particularly suited to more highly loaded regions of the fuselage.

In one variant (not shown) of this embodiment, the first wing 104 locally comprises legs 114 only at those points for preventing lateral-torsional buckling of the element as a function of localized stresses.

Figure 4:
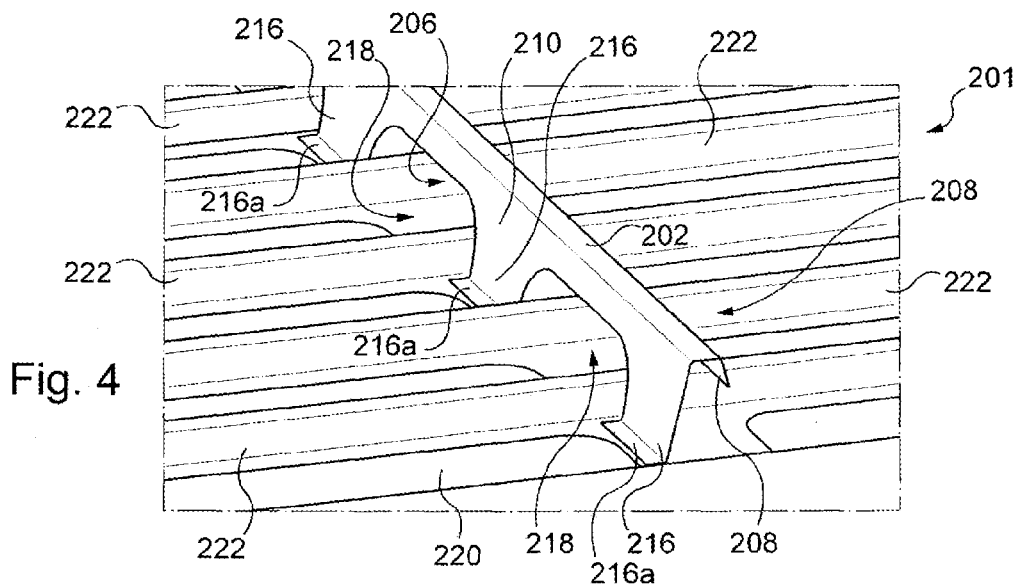
FIG. 4 is a schematic perspective representation of a structural element attached to a structural skin of an aircraft fuselage and through which pass stringers of this same structure in a third embodiment according to the invention.

FIG. 4 shows a third embodiment according to the invention.

In this embodiment, a structural element 201 still comprises a base 202 which is depicted as flat but is intended to match, overall, the structure of the fuselage. At its ends extend first and second wings 204, 206 respectively comprising bodies 208, 210 which extend without interruption along the longitudinal direction of the structural element 201.

The first wing 204 (not shown in FIG. 4) remains unchanged with respect to the first wing 4 of the first embodiment. It comprises the same number and the same arrangement of legs 214 and openings 217. The legs 214 still extend from the corresponding wing at an angle slightly greater than 90° and are attached to a skin 220 by planar contact of the feet 214a.

The second wing 206, for its part, extends from the base 202 at the same angle (in absolute terms) as the first wing 204 and is attached via the feet 216a of the legs 216 to the skin 220. The structural element 201 therefore has a hat-shaped overall cross section.

The first and second legs 214, 216 and the first and second openings 217, 218 are arranged, as in the first embodiment, such that two stringers 222 attached to the skin 220 can pass through each opening. The "staggered" arrangement of FIGS. 2a, 2b appears here too.

The advantage of the hat-shaped overall cross section is that it improves in an alternative manner the lateral-torsional buckling strength of the structural element 201. In a fourth embodiment, not shown, the wings are arranged in a hat shape, and one of them comprises a number of openings through each of which a single stringer can pass.

In other possible embodiments, not shown, the openings are not arranged in a regular fashion, or even may accommodate a larger number of stringers.

A method for manufacturing the fuselage structural elements according to the invention will now be described with reference to FIGS. 5 and 6.

This method relates in particular to composite materials (thermosets, thermoplastics or textile-based) or also metallic materials and fiber metal laminates.

In the case of a composite material manufactured by resin infusion, in particular dry fabric preform resin infusion, the structural element or frame is made from a single initially flat fibrous preform (the manufacture of which, being known per se, will not be explained here).

Figure 5:
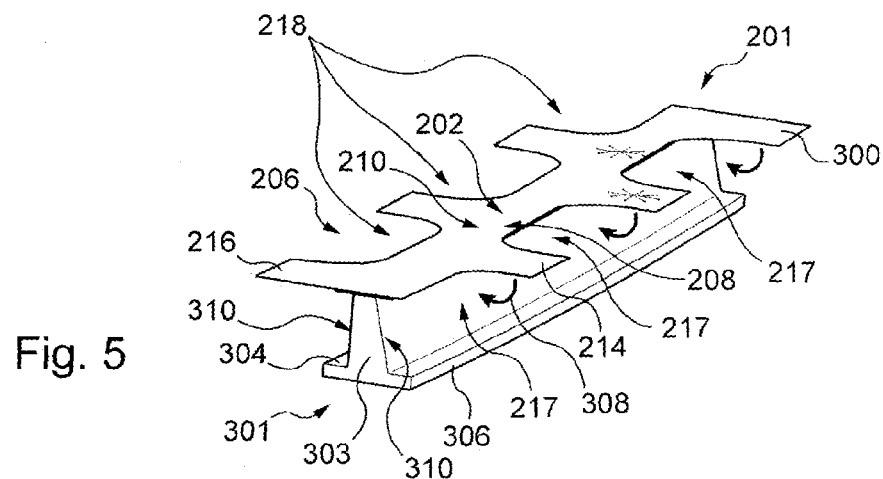
FIG. 5 is a schematic perspective representation of the structural element of FIG. 4, before it is shaped on a curved tooling.
Figure 6:
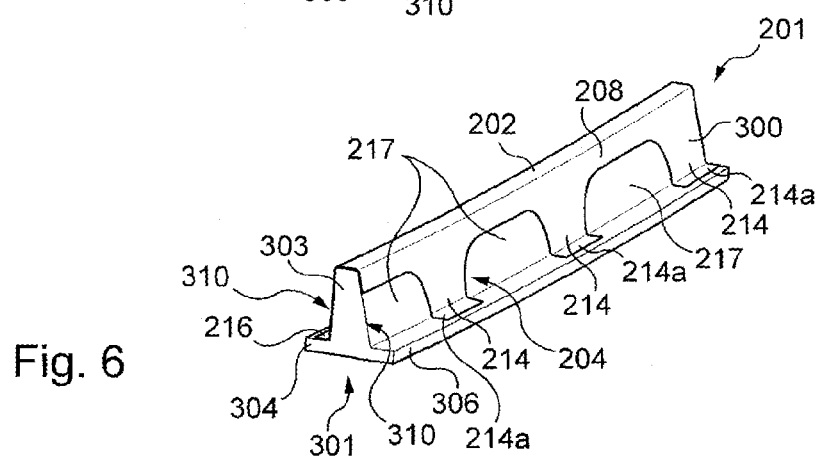
FIG. 6 is a schematic perspective representation of the structural element of FIG. 4, after shaping on the tooling of FIG. 5.
Figure 7:
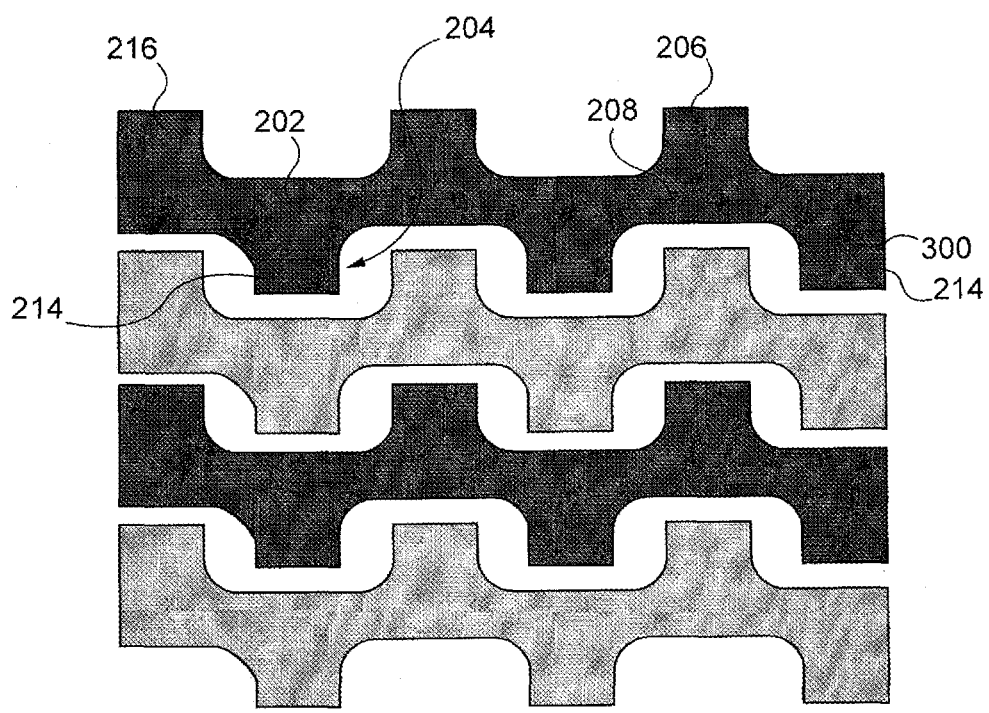
FIG. 7 is a schematic representation of structural elements of FIG. 4, before they are shaped on the tooling of FIG. 5.

Such a preform or blank is numbered 300 in FIGS. 5 and 6. The preform or blank is flat and is cut from a generally rectangular initial shape, according to the desired shape and arrangement for the legs and openings, as shown in FIG. 7.

In this case, the preform 300 makes it possible to obtain a structural element according to any embodiment, having openings which are in a "staggered" arrangement and through which two stringers can pass, such as for example the first or second forms shown in FIGS. 1, 2a, 2b, and 4.

However, given the shape of the tooling 301, the structural element obtained will conform to the third embodiment (FIG. 4). The same numbering as in this figure will therefore be used.

Thus, the preform 300 has a base 202, and bodies 208, 210 and first and second wings 204, 206 which are initially in the same plane. It will be noted to that end that it is possible to create multiple preforms cut from a rectangle by overlapping the wings of one preform into the openings of another, as shown in FIG. 7. This has the advantage of minimizing the amount of discarded material.

The preform 300 is placed on the tooling 301 which has a slight curvature along its longitudinal direction so as to locally match the circumference of an aircraft fuselage.

More precisely, the radius of curvature of the tooling 301 is perpendicular to the plane of the skin 220 onto which the structural element 201 will be placed, that is to say perpendicular to the plane formed by the first and second longitudinal directions.

The cross section of the tooling 301 matches the separation and the orientation with respect to the base 202 of the first and second wings 204, 206 which are to be obtained by forming on the tooling.

Here, the tooling 301 comprises a solid body 303 in the shape of a regular trapezium and two soles, left 304 and right 306. These extend respectively to the left and to the right from the lower base of the trapezium, perpendicular thereto. The tooling thus has a hat-shaped overall cross section.

A method according to the invention provides for draping the preform 300 onto the tooling 301 in the direction of the arrows 308. The flat preform 300 is thus placed on the base of the tooling (upper base of the trapezium) and, with the aid of a tool which is not shown (die, etc.), high pressure is exerted on the base 202 in order that it matches the curvature of the tooling and the legs 204, 206 (or tabs) are folded down against the lateral flanks 310 and the soles 304, 306 of the tooling. FIG. 6 shows the preform 300 after draping.

By way of example, in the case of a preform having fibers oriented at 0°, 45°, −45° and 90°, the fibers oriented at 0° are aligned on the longitudinal direction of the preform 300.

Such an operation was made difficult or even impossible (in the case of plies at 0° in the base), in the prior art in which the wings and the legs of the structural element were too wide, which caused draping problems linked to the shaping of continuous fibers.

By virtue of the provisions of the invention, the orientation of the fibers is only slightly altered by the folding force as the presence of the openings 217, 218 on each wing facilitates draping. The "staggered" 10 arrangement is particularly favorable in this respect.

Draping on a curved tooling has the advantage of being able to envisage structural elements which are longer as they match the local shape of the fuselage.

This limits the number of fasteners to be provided between the elements forming the fuselage frames and, as a consequence, the time and costs for manufacturing or maintenance.

Moreover, the simplicity of the method makes it possible to envisage mass production.

The locally greater thickness of the base 202 and of the bodies 208, 210 makes it possible to locally strengthen the structural element 201.

In other embodiments which are not shown, it is possible to envisage a preform of uniform thickness, or on the contrary to provide that the wings or the legs are thicker than the base and the bodies.

These choices depend in particular on the region in which the structural element is to be placed, depending on whether it is to be stronger or lighter.

It will also be noted that the shape of the tooling varies depending on the desired spacing between the wings. Thus, for example, in order to obtain the structural element of FIGS. 1, 2a and 2b, the left flank of the core of the tooling 303 will be perpendicular to the sole 304.

The number of legs and the shape of the openings depend, for their part, only on the shape of the preform 300. Whatever the shape of the preform, the folding step remains the same.

It will be noted that any one of the structural elements of the preceding figures and of the embodiments and variants not shown may be manufactured by forming according to the method just described with reference to FIGS. 5 and 6.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A structural element for an aircraft fuselage, comprising:
   the structural element is elongate in a longitudinal direction and comprises two wings,
   each wing comprising a part which extends uninterrupted over the entire length of the structural element and legs which are spaced apart from one another and extend from this uninterrupted part so as to define an opening between two consecutive legs, one of the legs of a wing being arranged opposite at least part of the opening defined between two consecutive legs of the other wing.

2. The structural element for an aircraft fuselage according to claim 1, wherein at least one of the two wings extends perpendicular to the longitudinal direction of the profile.

3. The structural element for an aircraft fuselage according to claim 1, wherein the opening of a first wing of the two wings is configured to receive at least two through elements of elongate shape in a direction transverse to the longitudinal direction of the structural element.

4. The structural element for an aircraft fuselage according to claim 1, wherein the openings of each wing are configured to receive two through elements of elongate shape in a direction transverse to the longitudinal direction of the structural element.

5. The structural element for an aircraft fuselage according to claim 1, wherein the opening of one of the two wings is configured to receive a single through element of elongate general shape in a direction transverse to the longitudinal direction of the structural element.

6. The structural element for an aircraft fuselage according to claim 1, wherein each wing comprises, at the free end of each leg, a foot which extends in a plane.

7. The structural element for an aircraft fuselage according to claim 6, wherein the structural element is curved such that its curvature is locally perpendicular to the plane in which extends the foot of each leg.

8. The structural element for an aircraft fuselage according to claim 6, wherein the legs of at least one wing are perpendicular to the feet of the wing.

9. The structural element for an aircraft fuselage according to claim 7, wherein the openings of said at least one wing whose legs are substantially perpendicular to the feet of the wing are intended to each receive a single through element of elongate general shape in a direction transverse to the longitudinal direction of the profile.

10. The structural element for an aircraft fuselage according to claim 5, wherein the legs of at least one wing form an obtuse angle with respect to the plane in which the foot of each leg extends.

11. The structural element for an aircraft fuselage according to claim 5, wherein each of the legs of the wings is perpendicular to the feet of each wing.

12. The structural element for an aircraft fuselage according to claim 1, wherein the height of each wing varies along the longitudinal direction of the structural element.

13. The structural element for an aircraft fuselage according to claim 1, wherein a thickness of the element varies along the longitudinal direction of the profile.

14. A method for manufacturing a structural element for an aircraft fuselage according to claim 1, comprising a step of:
   forming, on a tooling, a flat preform of the structural element.

15. The method according to claim 14, wherein each wing of the structural element for an aircraft fuselage comprises, at the free end of each leg, a foot which extends in a plane, the tooling having a curvature whose radius of curvature is perpendicular to said plane.

16. An aircraft having a structural element for an aircraft fuselage, comprising:
   the structural element is elongate in a longitudinal direction and comprises two wings,
   each wing comprising a part which extends uninterrupted over the entire length of the structural element and legs which are spaced apart from one another and extend from this uninterrupted part so as to define an opening between two consecutive legs, one of the legs of a wing being arranged opposite at least part of the opening defined between two consecutive legs of the other wing.

\* \* \* \* \*